(12) United States Patent
Oljaca et al.

(10) Patent No.: US 10,790,757 B2
(45) Date of Patent: Sep. 29, 2020

(54) GALVANIC ISOLATION DEVICES TO PROVIDE POWER AND DATA BETWEEN SUBSYSTEMS

(71) Applicant: TEXAS INSTRUMENTS INCORPORATED, Dallas, TX (US)

(72) Inventors: Miroslav Oljaca, Allen, TX (US); Ajinder Singh, Murphy, TX (US); Sharad Yadav, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 385 days.

(21) Appl. No.: 15/836,709

(22) Filed: Dec. 8, 2017

(65) Prior Publication Data
US 2019/0181769 A1 Jun. 13, 2019

(51) Int. Cl.
| | | |
|---|---|---|
| *H02M 5/10* | (2006.01) | |
| *G01K 7/01* | (2006.01) | |
| *G01K 7/34* | (2006.01) | |
| *H01F 27/29* | (2006.01) | |
| *H02M 3/335* | (2006.01) | |
| *H02M 1/00* | (2006.01) | |

(52) U.S. Cl.
CPC ............... *H02M 5/10* (2013.01); *G01K 7/01* (2013.01); *G01K 7/34* (2013.01); *H01F 27/29* (2013.01); *H02M 3/33576* (2013.01); *H02M 2001/0064* (2013.01)

(58) Field of Classification Search
CPC ............ G01K 7/01; G01K 7/34; H01F 27/29; H02M 5/10; H02M 2001/0064; H02M 3/33576
See application file for complete search history.

(56) References Cited

U.S. PATENT DOCUMENTS

| | | | |
|---|---|---|---|
| 2015/0256227 A1* | 9/2015 | Teggatz | H04B 5/0037 307/104 |
| 2017/0033603 A1* | 2/2017 | Peter | H03F 3/45179 |
| 2017/0299444 A1* | 10/2017 | Green | G01K 7/24 |
| 2019/0067930 A1* | 2/2019 | Male | H02H 3/207 |

* cited by examiner

*Primary Examiner* — Jay Patidar
(74) *Attorney, Agent, or Firm* — John R. Pessetto; Charles A. Brill; Frank D. Cimino

(57) ABSTRACT

In some examples, a system comprises a control subsystem comprising a static power supply, a modulated power supply, and a comparator. The system also includes a galvanic isolation device coupled to the static power supply, the modulated power supply, and the comparator. The system further includes a parameter measurement subsystem comprising a parameter measurement device coupled to a capacitor to be charged by the static and modulated power supplies via the galvanic isolation device. The capacitor has an electrical connection to the galvanic isolation device modulated in accordance with a current pulse train output by the parameter measurement device, the current pulse train indicating a parameter measured by the parameter measurement device. The comparator is to produce a signal indicative of the modulated electrical connection between the capacitor and the galvanic isolation device.

19 Claims, 3 Drawing Sheets

GALVANIC ISOLATION DEVICES TO PROVIDE POWER AND DATA BETWEEN SUBSYSTEMS

BACKGROUND

Electronic systems are often designed to measure one or more parameters in the course of performing one or more functions. For example, electronic systems measure temperature, pressure, charge, current, voltage, and other such parameters in the performance of their duties. In some cases, the electronic systems are high voltage or high current systems and thus require the use of galvanic isolation techniques for safety reasons and to prevent damage to the electronic systems. Both power signals and data signals are to be transferred across galvanic isolation barriers.

SUMMARY

In some examples, a system comprises a control subsystem comprising a static power supply, a modulated power supply, and a comparator. The system also includes a galvanic isolation device coupled to the static power supply, the modulated power supply, and the comparator. The system further includes a parameter measurement subsystem comprising a parameter measurement device coupled to a capacitor to be charged by the static and modulated power supplies via the galvanic isolation device. The capacitor has an electrical connection to the galvanic isolation device modulated in accordance with a current pulse train output by the parameter measurement device, the current pulse train indicating a parameter measured by the parameter measurement device. The comparator is to produce a signal indicative of the modulated electrical connection between the capacitor and the galvanic isolation device.

In some examples, a system comprises a transformer with primary and secondary sides having multiple winding taps, a first switch coupled to a first tap on the primary side and to ground, the first switch coupled to a modulated power supply, a power supply coupled to a second tap on the primary side, a comparator having inputs coupled to the first and second taps on the primary side, a second switch coupled to a first tap on the secondary side, the second switch coupled in parallel with a first diode, a third switch coupled to the second switch and to a second tap on the secondary side, a parameter measurement device coupled to the second and third switches, and a capacitor coupled to the parameter measurement device.

In some examples, a method comprises providing a control subsystem and a parameter measurement subsystem, charging a capacitor in the parameter measurement subsystem using the control subsystem and a galvanic isolation device, applying a voltage to a parameter measurement device in the parameter measurement subsystem using the capacitor, measuring a parameter using the parameter measurement device, producing a current pulse train using the parameter measurement device, the current pulse train indicative of the measured parameter, opening and closing a switch using the current pulse train, the opening and closing of the switch modulating an electrical connection between the capacitor and the galvanic isolation device, and interpreting the modulated electrical connection between the capacitor and the galvanic isolation device to determine the measured parameter.

BRIEF DESCRIPTION OF THE DRAWINGS

For a detailed description of various examples, reference will now be made to the accompanying drawings in which.

DETAILED DESCRIPTION

Figure 1:
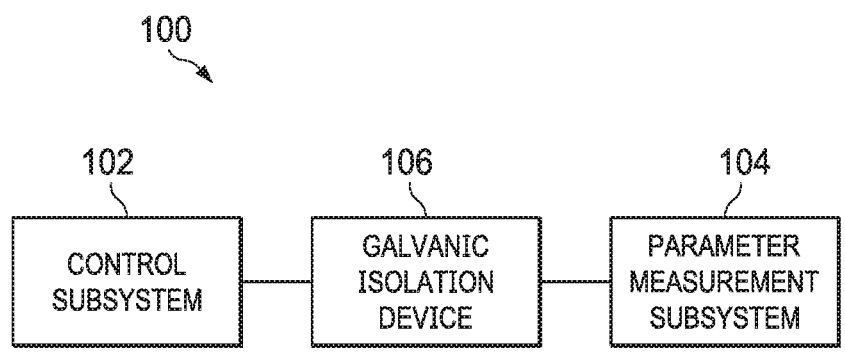
FIG. 1 is a block diagram of an illustrative electronic system in accordance with various embodiments.

Presently, an electronic system requiring galvanic isolation between two of its constituent subsystems will often position multiple galvanic isolation devices, such as multiple transformers, between the subsystems. Multiple galvanic isolation devices are used because both power and data signals are to be transferred between the subsystems. In such systems, power is transferred via one isolation device, and data signals are transferred via a different isolation device. Relative to the embodiments described herein, such systems require a large amount of expensive circuitry, occupy a significant amount of space, and consume high amounts of power.

Accordingly, disclosed herein are various embodiments of an electronic system that uses a single galvanic isolation device to transfer both power and data signals between subsystems. Relative to present electronic systems, such embodiments reduce the amount of circuitry and attendant space used, and they also significantly reduce power consumption. An illustrative electronic system includes a control subsystem and a parameter measurement subsystem that is galvanically isolated from the control subsystem with a single galvanic isolation device. In some embodiments, the parameter measurement subsystem includes a parameter measurement device that is configured to measure any of a variety of parameters (e.g., temperature). The parameter measurement subsystem includes a chargeable device, such as a capacitor, that provides power to the parameter measurement device to enable the parameter measurement device to perform and output its parameter measurements. The control subsystem includes a static power supply and a modulated power supply (e.g., pulse width modulation burst signals) that collectively charge the capacitor via the single galvanic isolation device.

Once the capacitor is adequately charged, the parameter measurement device begins measuring the relevant parameter. After the relevant parameter has been measured, the parameter measurement device begins issuing a current (or voltage) pulse train in which the measured parameter is encoded (e.g., using pulse-count modulation, where the measured parameter is encoded based on a number of pulses, or using frequency modulation or any other suitable type of modulation). The parameter measurement subsystem includes one or more switches that are opened and closed by the current pulse train. In some embodiments, the one or more switches modulate the electrical coupling between the capacitor and the galvanic isolation device. More specifically, when the switches are closed, the capacitor couples in parallel to the galvanic isolation device, and when the switches are open, the capacitor does not couple in parallel to the galvanic isolation device. In this way, the current pulse train modulates the electrical connection between the capacitor and the galvanic isolation device and thus causes the control subsystem to receive a voltage via the single galvanic isolation device that encodes (e.g., via pulse-count modulation; via frequency modulation or any other suitable type of modulation) the parameter measured by the parameter measurement device. The control subsystem includes a comparator that receives as inputs the modulated signal from the galvanic isolation device and the static power supply as a reference signal. (In some examples, the signal reflected across the galvanic isolation device resembles a sinusoidal decaying waveform rather than a square waveform, so the comparator is usable to convert the sinusoidal decaying waveform into a square waveform with pulses that can be more accurately counted. The scope of this disclosure, however, encompasses embodiments in which such a comparator is omitted.) The output of the comparator is modulated to indicate the measured parameter and is de-modulated (e.g., pulse-counted) to determine the measured parameter value. Once the measured parameter value has been determined, the process repeats. Illustrative embodiments of the galvanic isolation system are now described in greater detail with respect to FIGS. 1-4.

FIG. 1 is a block diagram of an illustrative electronic system 100 in accordance with various embodiments. The illustrative system 100 includes a control subsystem 102, a parameter measurement subsystem 104, and a single galvanic isolation device 106 coupled between the control subsystem 102 and the parameter measurement subsystem 104. The galvanic isolation device 106 includes, for example, a single transformer. In other embodiments, other types of galvanic isolation devices 106 are used, such as capacitive isolators, opto-isolators and/or Hall Effect sensors, although the scope of this disclosure is not limited as such. The control subsystem 102 is any suitable group of components that is to provide power to the parameter measurement subsystem 104 via the galvanic isolation device 106 and that is to receive measurement data from the parameter measurement system 104. For example, in some embodiments, the control subsystem 102 includes and provides a static power supply to one tap in the galvanic isolation device 106 and further includes and provides a modulated power supply (e.g., pulse-width modulated burst signals) to another tap in the galvanic isolation device 106, as described below with reference to FIG. 2. The parameter measurement subsystem 104 is any suitable group of components that is to receive power from the control subsystem 102 and that is to use the received power to measure a parameter. The parameter measurement subsystem 104 also encodes and provides the measured parameter to the control subsystem 102 via the same galvanic isolation device 106 that was used to provide power to the parameter measurement subsystem 104. In this way, the subsystems 102, 104 alternatingly provide power and data signals to each other using the same galvanic isolation device 106. Specific, illustrative components within the subsystems 102, 104 and the manner of their operation are now described in detail with respect to FIGS. 2-4.

Figure 2:
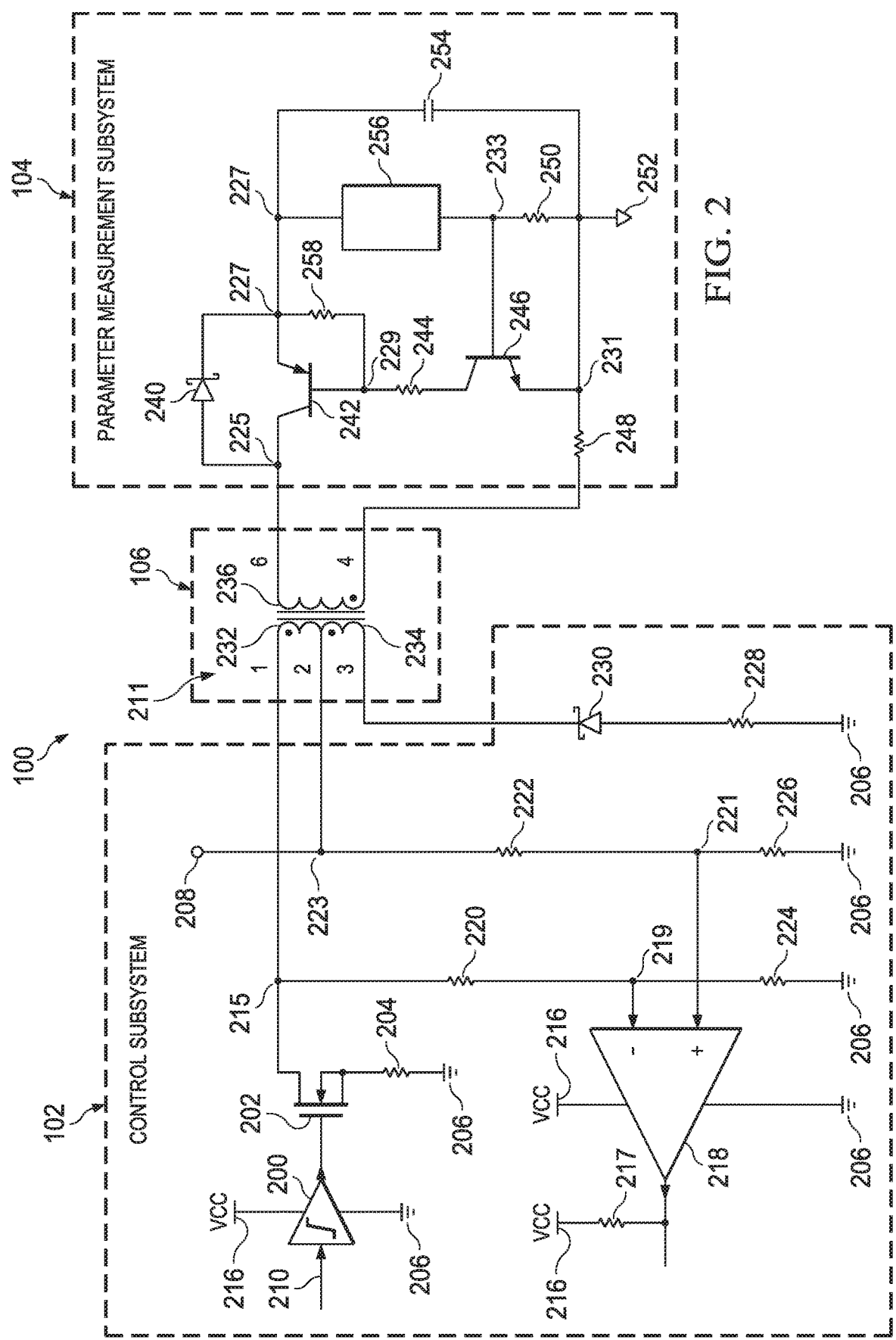
FIG. 2 is a circuit schematic diagram of an illustrative electronic system in accordance with various embodiments.

FIG. 2 is a circuit schematic diagram of the illustrative electronic system 100 in accordance with various embodiments. The components of the system 100 are described first, followed by a description of the operation of the system 100. As previously explained, in some examples, the system 100 includes a control subsystem 102, a parameter measurement subsystem 104, and a galvanic isolation device 106. The control subsystem 102, in some embodiments, includes an inverter 200 (e.g., TEXAS INSTRUMENTS® SN74LVC2G14DBVR). A modulated power supply 210 (e.g., pulse-width modulation burst signals) is provided from a controller (not expressly depicted) outside of or within the control subsystem 102 to the inverter 200. The inverter 200 is powered by a VCC supply 216 and couples to a ground connection 206. An output of the inverter 200 couples to a gate of a metal oxide semiconductor field effect transistor (MOSFET) 202 (e.g., n-type MOSFET). A source of the MOSFET 202 couples to a resistor 204 which, in turn, couples to the ground connection 206. A drain of the MOSFET 202 couples to a node 215. A static power supply 208 couples to a node 223. The static power supply 208—which, in some embodiments, is the same as the VCC supply 216—includes a substantially static (e.g., variation of less than 5% from a baseline) voltage that is received from, e.g., a controller (not expressly depicted) outside or within the control subsystem 102. Generally, a "power supply" is any component that supplies power or is the power itself. For example, a "power supply" can include a power supply device (whether or not expressly depicted and described herein), a power supply connection (or "rail"), and/or a power supply voltage and/or current.

The node 215 couples to a resistor 220, which, in turn, couples to a node 219. The node 219, in turn, couples to an input of a comparator 218 (e.g., TEXAS INSTRUMENTS® LMV331IDBV). The node 223 couples to a resistor 222, which, in turn, couples to a node 221. The node 221 couples to another input of the comparator 218. The node 219 couples to a resistor 224, which, in turn, couples to the ground connection 206. Similarly, the node 221 couples to a resistor 226, which, in turn, couples to the ground connection 206. The resistors 220, 224 form a voltage divider to step down the voltage at node 215 so that the voltage at node 219 is suitable for input to the comparator 218. Similarly, the resistors 222, 226 form another voltage divider to step down the voltage at node 223 so that the voltage at node 221 is suitable for input to the comparator 218. In some examples, the degree to which the two voltage dividers step down their respective voltages is proportional such that the stepped-down voltages have the same or similar relationship to each other as do the voltages at nodes 215, 223. The comparator 218 is powered by the VCC supply 216 and couples to the ground connection 206. An output of the comparator 218 couples to an optional pull-up resistor 217. The pull-up resistor 217 couples to the VCC supply 216. The subsystem 102 also includes a diode 230, the anode of which couples to a resistor 228. The resistor 228, in turn, couples to the ground connection 206. A cathode of the diode 230 couples to a tap in the galvanic isolation device 106.

In some embodiments, the galvanic isolation device 106 includes a single transformer 211, although the scope of disclosure encompasses other types of galvanic isolation devices, as explained above. In this disclosure, the galvanic isolation device 106 and the transformer 211 are referenced interchangeably, although a transformer is a type of galvanic isolation device and thus the term "galvanic isolation device" is broader in scope than the term "transformer." In some embodiments, the transformer 211 includes windings 232, 234, and 236, and it includes taps 1-4 and 6. The taps 1 and 2, which correspond to the winding 232, couple to nodes 215 and 223, respectively. Taps 2 and 3 correspond to winding 234, and tap 3 couples to the cathode of the diode 230.

In some embodiments, the parameter measurement subsystem 104 comprises a diode 240 coupled to the emitter and collector of a transistor 242 (e.g., bi-polar junction transistor) at nodes 227 and 225. The node 225 couples to the tap 6 of the transformer 211. The subsystem 104 further includes a resistor 244 that couples to the base of the transistor 242 via node 229. The node 229 couples to node 227 via a resistor 258. The subsystem 104 further comprises a transistor 246 (e.g., bi-polar junction transistor), the collector of which couples to the resistor 244, the base of which couples to a node 233, and the emitter of which couples to a node 231. The node 231 couples to a resistor 248, which, in turn, couples to tap 4 of the transformer 211. In some embodiments, the resistor 248 is omitted. The node 233 couples to node 231 via a resistor 250. Node 231 also couples to an isolated ground connection 252, which is galvanically isolated from the ground connections 206. Nodes 227 and 231 couple to each other via a chargeable device, such as a capacitor 254. The subsystem 104 also includes a parameter measurement device 256 (e.g., TEXAS INSTRUMENTS® LMT01LPG) to measure any of a variety of parameters, such as ambient temperature.

In some embodiments, the device 256 includes multiple pins. One of the pins couples to node 227, and another one of the pins couples to node 233. In some embodiments, the pins are used to receive power (e.g., voltage) to the device 256. In some embodiments, at least one of the pins, such as the pin coupling to the node 233, is also used to output signals (e.g., current pulse trains) that encode, such as through frequency modulation, the parameters measured by the device 256. The values for the various components depicted in FIG. 2, including resistors, capacitors, transistors, power supplies, etc., are selected as desired such that the electronic system 100 operates as described herein.

In operation, the modulated power supply 210, the inverter 200, and the MOSFET 202 form an open drain driver for the transformer 211. In some embodiments, these three components are replaced with a push-pull driver ASIC, such as a SN6505B IC by TEXAS INSTRUMENTS®. When the MOSFET 202 acts as a closed switch, node 215 couples to the ground connection 206 via the current-limiting resistor 204. When the MOSFET 202 acts as an open switch, node 215 does not couple to the ground connection 206 via the resistor 204. The pulsed nature of the modulated power supply 210 and the resultant switching action of the MOSFET 202 result in a pulsed voltage at the node 215, which is applied to tap 1 of the transformer 211. The static power supply 208 is provided to node 223, which is applied to tap 2 of the transformer 211. The resistor 228 is usable for, e.g., circuit testing purposes and in some embodiments is omitted.

The transformer 211 provides the voltage that is applied at the taps on the primary side (i.e., the side of the control subsystem 102) to the taps 4 and 6 on the secondary side (i.e., the side of the parameter measurement subsystem 104). The diode 240 is forward-biased while the transistor 242 is switched off. The diode 240 facilitates charging of the capacitor 254. Tap 4 couples to the capacitor 254 via the optional resistor 248 or by way of a direct connection. In this manner, the capacitor 254 essentially couples in parallel to the taps 4 and 6 and is charged by the voltage received from the power supplies in the control subsystem 102. The capacitance of the capacitor 254 is chosen as desired, although in at least some embodiments, the capacitance is selected so as to provide sufficient voltage for a sufficient length of time to enable the remaining components of the parameter measurement subsystem 104—and, in particular the parameter measurement device 256—to perform the functions attributed to them herein.

After the capacitor 254 ceases charging and is adequately charged so that the parameter measurement device 256 receives at least a threshold voltage (e.g., approximately 2 V), the parameter measurement device 256 is activated and begins measuring the relevant parameter (e.g., ambient temperature). (In some cases, the voltage provided to the nodes 227 and 231 from the transformer 211 is sufficiently low that there is no direct activation of the parameter measurement device 256 by the power provided from the control subsystem 102.) After the parameter measurement device 256 has completed measurement of the relevant parameter, it issues a current pulse train that is modulated (e.g., pulse-count modulated; frequency modulated) to encode the measured parameter. The parameter measurement device 256, for example, issues the current pulse train on the node 233, although the scope of disclosure is not limited as such. In the event that a different type of parameter measurement device 256 is used than the type depicted in FIG. 2, a pin of the device 256 that issues the current pulse train couples to the node 233 and thus provides the current pulse train to the node 233.

When the current pulse train on node 233 is high, the resistor 250 causes a proper voltage to be applied to the base of the transistor 246 so as to switch the transistor 246 on. The switching on of the transistor 246, in turn, causes the transistor 242 to switch on. The resistors 244 and 258 form a voltage divider so that a proper voltage is provided so as to turn on the transistor 242 when the transistor 246 is on. The resistor 244 limits the base current of transistor 242, and the resistor 258 facilitates deactivation of the transistor 242 when there is no current or signal at node 233. When the transistor 242 is switched on, there is a parallel coupling between the capacitor 254 and the transformer 211. (The optional resistor 248 is absent, or, in some cases, it is present to limit current applied to the transformer 211. In the latter scenario, voltage from the capacitor 254 is still applied to the transformer 211, and the connection therebetween is referred to as "substantially parallel.") The capacitor 254 applies a voltage to the transformer 211 as long as it remains charged and the transistor 242 remains on. If the transistor 242 turns off, the transformer 211 ceases receiving a voltage from the capacitor 254. Thus, the voltage applied from the capacitor 254 to the transformer 211 is modulated by switching the transistor 242 on and off. The transistor 242 is switched on and off by the transistor 246, which, in turn, is switched on and off by the current pulse train issued by the parameter measurement device 256. Thus, the current pulse train issued by the device 256, which indicates the parameter measured by the device 256, modulates the voltage applied from the capacitor 254 to the transformer 211. Accordingly, the modulated voltage applied from the capacitor 254 to the transformer 211 indicates the measured parameter.

The modulated power supply 210 is turned off (low) when the capacitor 254 has been charged to a target charge level. To achieve this, the modulation of the supply 210 is designed based at least in part on the capacity of the capacitor 254. In addition, the modulated power supply 210 remains off while the modulated voltage indicating the measured parameter is provided from the secondary side to the primary side. Thus, the modulation of the supply 210 also depends on the speed with which the parameter measurement device 256 measures parameters. The modulated voltage on node 215 and the static power supply voltage on node 223 are divided down by the voltage dividers formed using resistors 220, 224 and 222, 226. The resultant voltages are provided to the comparator 218, which outputs a signal that indicates the measured parameter and that is de-modulated (e.g., frequency-counted) to determine the measured parameter. The pull-up resistor 217 is optionally used to pull up the output voltage of the comparator 218, for example, if the comparator 218 is an open collector type of comparator. After the measured parameter is determined, the modulated power supply 210 is again supplied to charge the capacitor 254 so that another measurement of the relevant parameter can be performed.

The specific operation of the galvanic isolation device 106 (e.g., transformer 211) is now described. As explained above, the modulated power supply 210 provides a pulsed signal (e.g., with a 50% duty cycle). When the output of the inverter 200 is a logic high, the transistor 202 is on and acts as a closed switch, meaning that the node 215 couples to ground 206. At that time, the node 223 has a potential at the voltage supplied by the static power supply 208. Thus, the voltage at pin 2 is higher than the voltage at pin 1 and, as a result, current flows in the direction of pin 2 to pin 1. At this time, the diode 230 is off. The current flowing through the coil 232 causes a voltage to form at pins 6 and 4 of winding 236, and this voltage is used by the parameter measurement subsystem 104 in the manner described above. When the pulsed nature of the modulated power supply 210 is such that the inverter 200 output is a logic low, the transistor 202 is off, meaning that the node 215 is floating. The voltage at pin 1 becomes the same as that at pin 2. However, at the moment that the transistor 202 turns off, there is a residual current that was previously flowing from pin 2 to pin 1 but that now has no potential between pins 2 and 1 to cause it to flow between pins 2 and 1. To resolve this issue, the diode 230 turns on, causing a potential to form between pins 2 and 3 and permitting the aforementioned residual current a path through which to flow—specifically, from ground 206, through resistor 228, through diode 230, through pins 3 and 2, through node 223, and to static power supply 208. At this time, the diode 240 does not turn on, and so the capacitor does not charge any further. When the parameter measurement device 256 completes its measurements and begins modulating the voltage provided by the capacitor 254 as described above, the voltage at pins 6 and 4 is classified as either logic high or logic low (e.g., 0 V). When the voltage is logic high, the potential at pin 6 is higher than the potential at pin 4. The diode 230 and the transistor 202 are off, and the current flowing through winding 236 causes a voltage to form across pins 2 and 1. This voltage is provided to the comparator 218, as described above. When the voltage at pins 6 and 4 is a logic low, no voltage is provided to pins 2 and 1.

Figure 3:
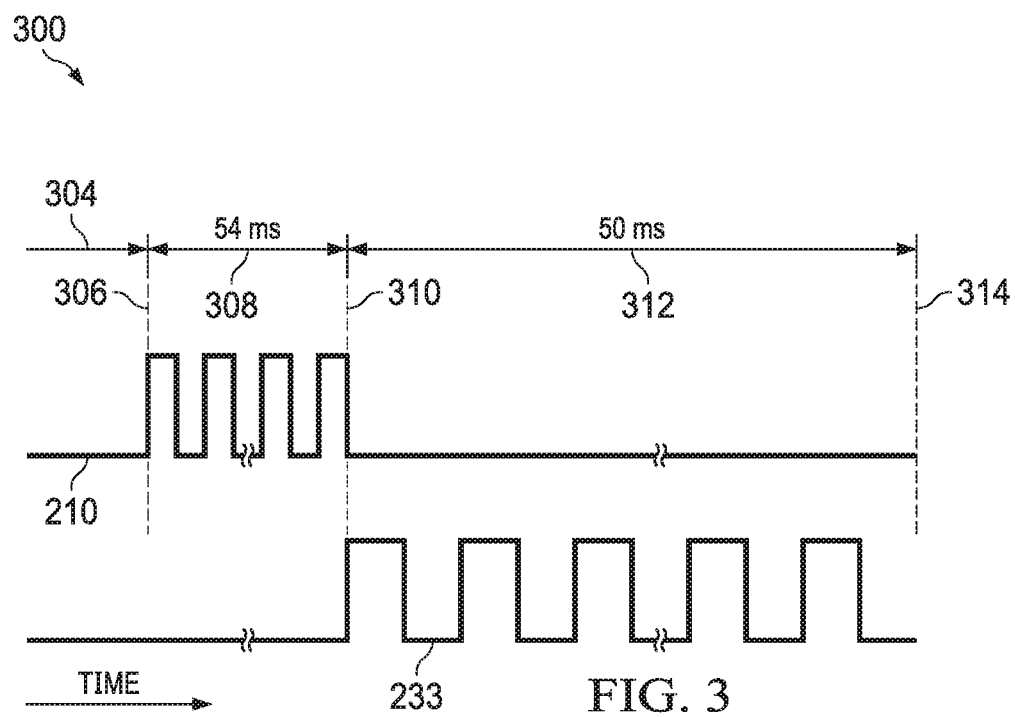
FIG. 3 is a timing diagram pertaining to an illustrative electronic system in accordance with various embodiments.

FIG. 3 is a timing diagram 300 pertaining to the operation of an illustrative electronic system, such as the electronic system 100, in accordance with various embodiments. The timing diagram 300 is described with respect to FIG. 2. The timing diagram 300 includes time along the x-axis and indicates the modulated power supply 210 and the current pulse train at node 233 output by the parameter measurement device 256. In timeframe 304 (i.e., prior to the time marked by numeral 306), the modulated power supply 210 is off (low). At time 306, time period 308 begins, during which the modulated power supply 210 begins to power the capacitor 254. Once the capacitor is sufficiently charged to provide the parameter measurement device 256 with a minimum threshold voltage, such as 2 V, the parameter measurement device 256 begins to measure the relevant parameter, which also occurs during the time period 308. In some embodiments, the time period 308 lasts for approximately 54 ms or less. For example, the initial 5 ms is for charging the capacitor 254 and the remainder of the time period 308 is for measuring the relevant parameter. The scope of disclosure, however, is not limited as such. In some examples, the modulated power supply 210 continues to charge the capacitor while the device 256 measures the relevant parameter(s).

When the time period 308 is complete at time 310, a time period 312 begins. At time 310, the modulated power supply 210 is off (is low), and during the time period 312, the parameter measurement device 256 issues the current pulse train encoding the measured parameter, as numeral 233 indicates. During the time period 312, the current pulse train is used to modulate the voltage applied by the capacitor 254 to transformer 211. In some embodiments, the time period 312 lasts for approximately 50 ms. When the time period 312 expires at time 314, the data transmission to the control subsystem 102 is complete, and the process repeats. In some embodiments, the current pulse train output by the parameter measurement device 256 is approximately 34 micro-amps when low and is approximately 125 micro-amps when high.

Figure 4:
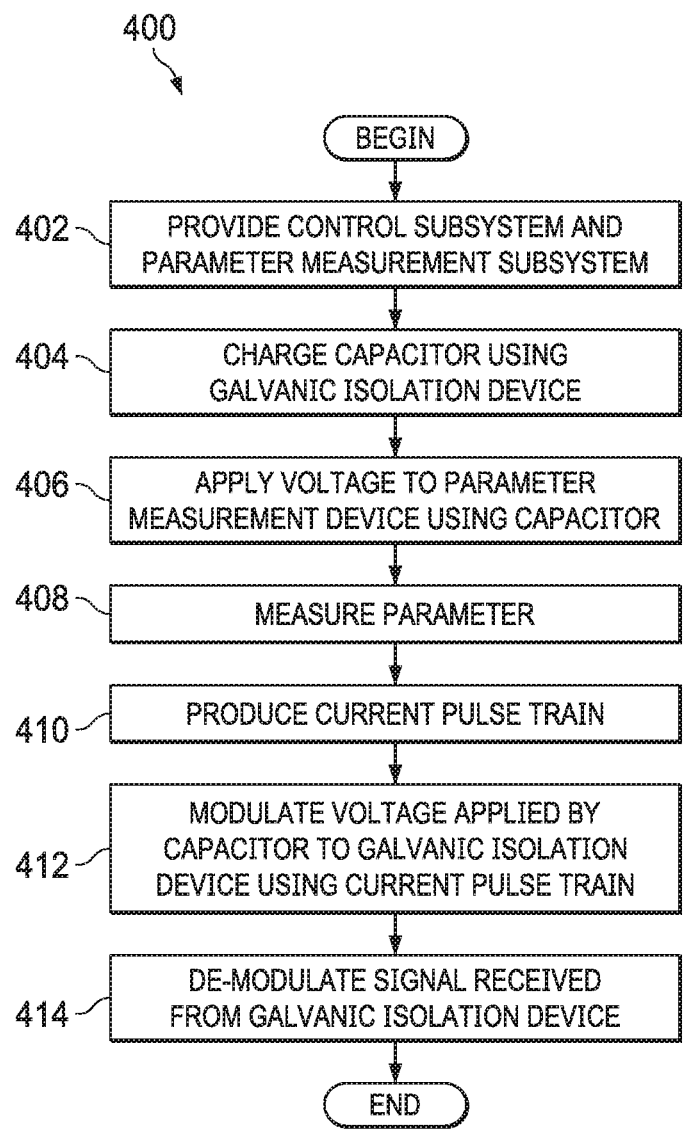
FIG. 4 is a flow diagram of an illustrative method performed by an electronic system in accordance with various embodiments.

FIG. 4 is a flow diagram of an illustrative method 400 performed by an electronic system in accordance with various embodiments. The illustrative method 400 begins by providing a control subsystem and a parameter measurement subsystem, such as the subsystems 102 and 104 depicted in FIGS. 1 and 2 (step 402). The method 400 next includes charging a capacitor, such as the capacitor 254, using a galvanic isolation device, such as the transformer 211 (step 404). The method 400 subsequently includes applying voltage from the charged capacitor to the parameter measurement device (step 406) and measuring the relevant parameter using the parameter measurement device (step 408). The method 400 next includes generating a current pulse train (step 410), such as that indicated by numeral 233 in FIG. 3. As explained, the current pulse train indicates the measured parameter. The method 400 subsequently comprises modulating the voltage applied by the capacitor to the transformer using the current pulse train (step 412). In some examples, this is accomplished by opening and closing a switch positioned between the capacitor and the transformer. The method 400 next comprises de-modulating the signal received by the control subsystem from the transformer (step 414). The method 400 is then complete. The method 400 can be adjusted as desired, including by adding, deleting, modifying, or rearranging one or more steps. For example, in some embodiments, the parameter measurement device 256 measures multiple parameters at a time and transmits the measured parameters as described above.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
 a control subsystem comprising a static power supply, a modulated power supply, and a comparator;
 a galvanic isolation device coupled to the static power supply, the modulated power supply, and the comparator; and
 a parameter measurement subsystem comprising a parameter measurement device coupled to a capacitor to be charged by the static and modulated power supplies via the galvanic isolation device, the capacitor having an electrical connection to the galvanic isolation device modulated in accordance with a current pulse train output by the parameter measurement device, the current pulse train indicating a parameter measured by the parameter measurement device, wherein the comparator is to produce a signal indicative of the modulated electrical connection between the capacitor and the galvanic isolation device.

2. The system of claim 1, wherein the parameter measurement device comprises a temperature sensor.

3. The system of claim 1, wherein the galvanic isolation device comprises a single transformer.

4. The system of claim 1, wherein the parameter measurement subsystem comprises a pair of transistors that are switched by the current pulse train.

5. The system of claim 1, wherein the parameter measurement device is to produce the current pulse train after the control subsystem has charged the capacitor to a threshold charge.

6. The system of claim 1, wherein a first input of the comparator couples to the static power supply and to a first tap of the galvanic isolation device, and wherein a second input of the comparator couples to a node to which the modulated power supply and a second tap of the galvanic isolation device couple.

7. A system comprising:
a transformer with primary and secondary sides having multiple winding taps;
a first switch coupled to a first tap on the primary side and to ground, the first switch coupled to a modulated power supply;
a power supply coupled to a second tap on the primary side;
a comparator having inputs coupled to the first and second taps on the primary side;
a second switch coupled to a first tap on the secondary side, the second switch coupled in parallel with a first diode;
a third switch coupled to the second switch and to a second tap on the secondary side;
a parameter measurement device coupled to the second and third switches; and
a capacitor coupled to the parameter measurement device.

8. The system of claim 7, further comprising a second diode having a cathode coupled to a third tap of the primary side, the second diode to dissipate current remaining in a winding of the primary side when the first switch is opened.

9. The system 7, further comprising an inverter having an output coupled to the first switch.

10. The system of claim 7, wherein the second switch couples to a node in between two resistors of a voltage divider.

11. The system of claim 10, wherein the second switch is a bipolar junction transistor (BJT), and wherein the third switch is also a BJT, a collector of the third switch coupled to the node via one of the two resistors.

12. The system of claim 7, wherein an output of the parameter measurement device controls the third switch, and wherein a current flow through the third switch controls the second switch.

13. The system of claim 7, wherein the parameter measurement device is configured to modulate a voltage provided by the capacitor.

14. The system of claim 7 further comprising first and second voltage dividers, the first voltage divider coupled to the first tap on the primary side and to an input of the comparator, the second voltage divider coupled to the second tap on the primary side and to another input of the comparator.

15. A method comprising:
providing a control subsystem and a parameter measurement subsystem;
charging a capacitor in the parameter measurement subsystem using the control subsystem and a galvanic isolation device;
applying a voltage to a parameter measurement device in the parameter measurement subsystem using the capacitor;
measuring a parameter using the parameter measurement device;
producing a current pulse train using the parameter measurement device, the current pulse train indicative of the measured parameter;
opening and closing a switch using the current pulse train, the opening and closing of the switch modulating an electrical connection between the capacitor and the galvanic isolation device; and
interpreting the modulated electrical connection between the capacitor and the galvanic isolation device to determine the measured parameter.

16. The method of claim 15, wherein interpreting the modulated electrical connection comprises using a comparator to compare a static power supply and a signal on a tap of the galvanic isolation device.

17. The method of claim 15, wherein charging the capacitor in the parameter measurement subsystem using the control subsystem and the galvanic isolation device comprises:
in response to a modulated power supply being in a first state, shutting off a transistor coupled to a first tap of the galvanic isolation device such that no current flows through a primary side of the galvanic isolation device; and
in response to the modulated power supply being in a second state, turning on the transistor such that the first tap couples to ground and a current flows through the primary side of the galvanic isolation device.

18. The method of claim 17, further comprising discharging current in the primary side using a diode coupled to a third tap of the galvanic isolation device.

19. The method of claim 15, wherein the galvanic isolation device comprises a single transformer, and wherein the parameter measurement device comprises a temperature sensor.

* * * * *